Sept. 20, 1966     LE ROY F. DE SHON ETAL     3,273,748
HELIX ARTICLE VENDOR
Filed Oct. 28, 1964     6 Sheets-Sheet 1
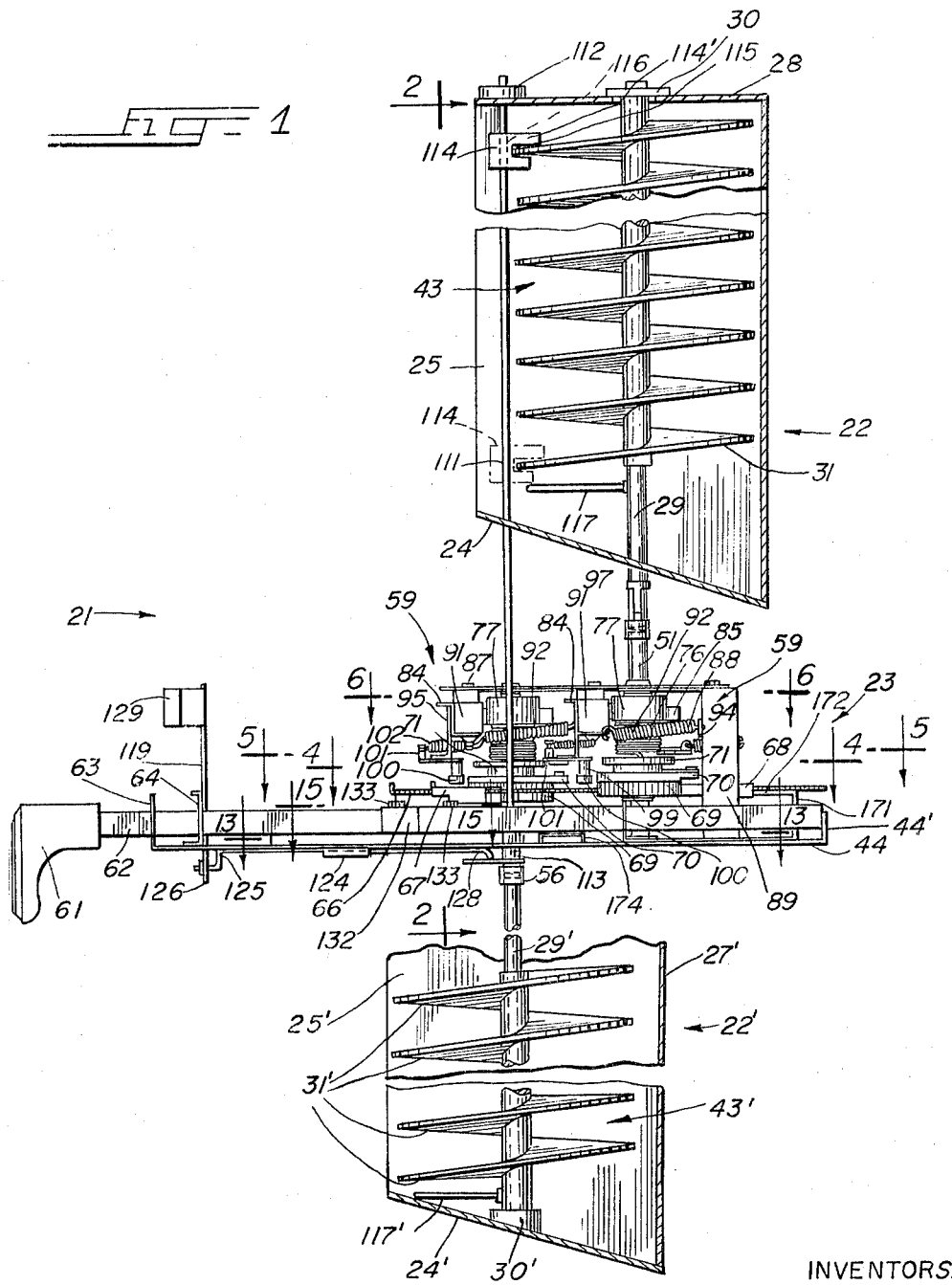
INVENTORS.
LEROY F. DESHON
MAHLON W. KENNEY
BY
ATTY.

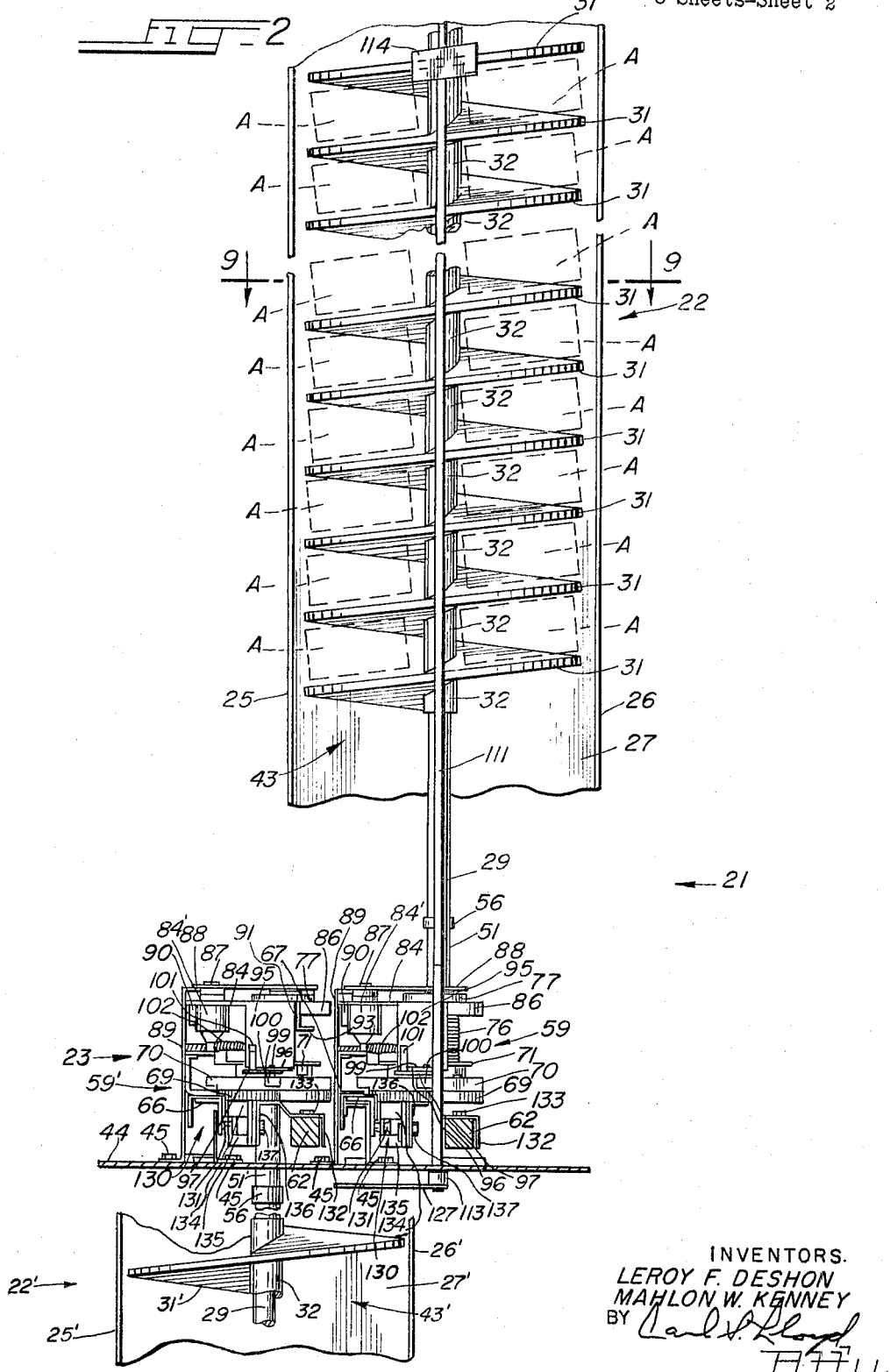

Sept. 20, 1966 LE ROY F. DE SHON ETAL 3,273,748
HELIX ARTICLE VENDOR
Filed Oct. 28, 1964 6 Sheets-Sheet 3
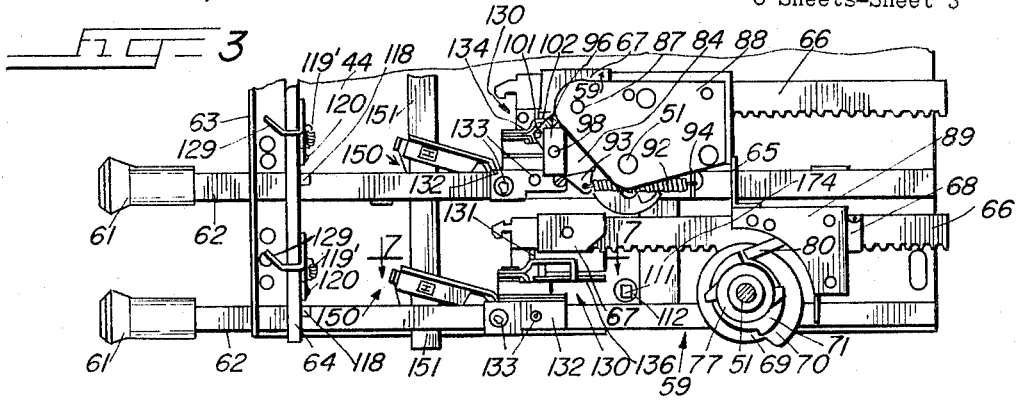
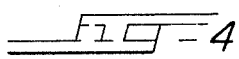
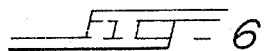
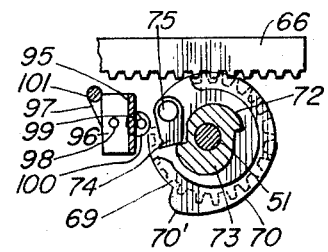
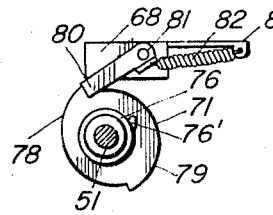
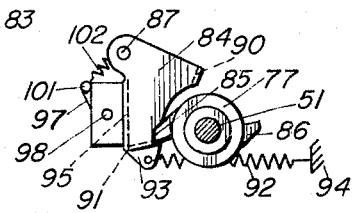
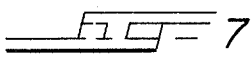
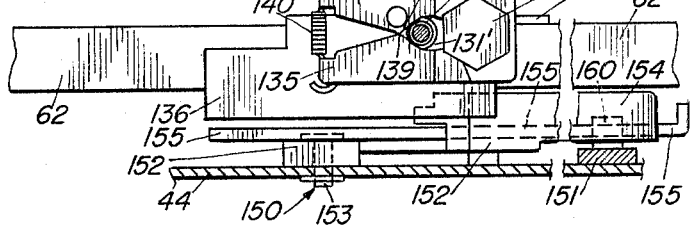
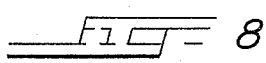
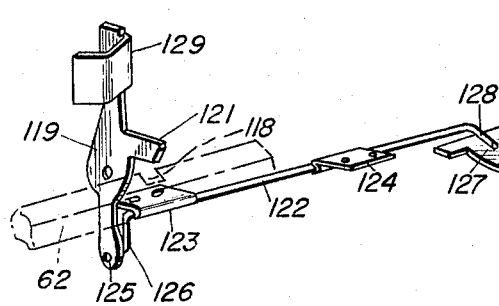
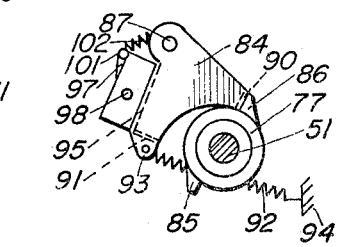
INVENTORS.
LEROY F. DESHON
MAHLON W. KENNEY
BY
ATTY.

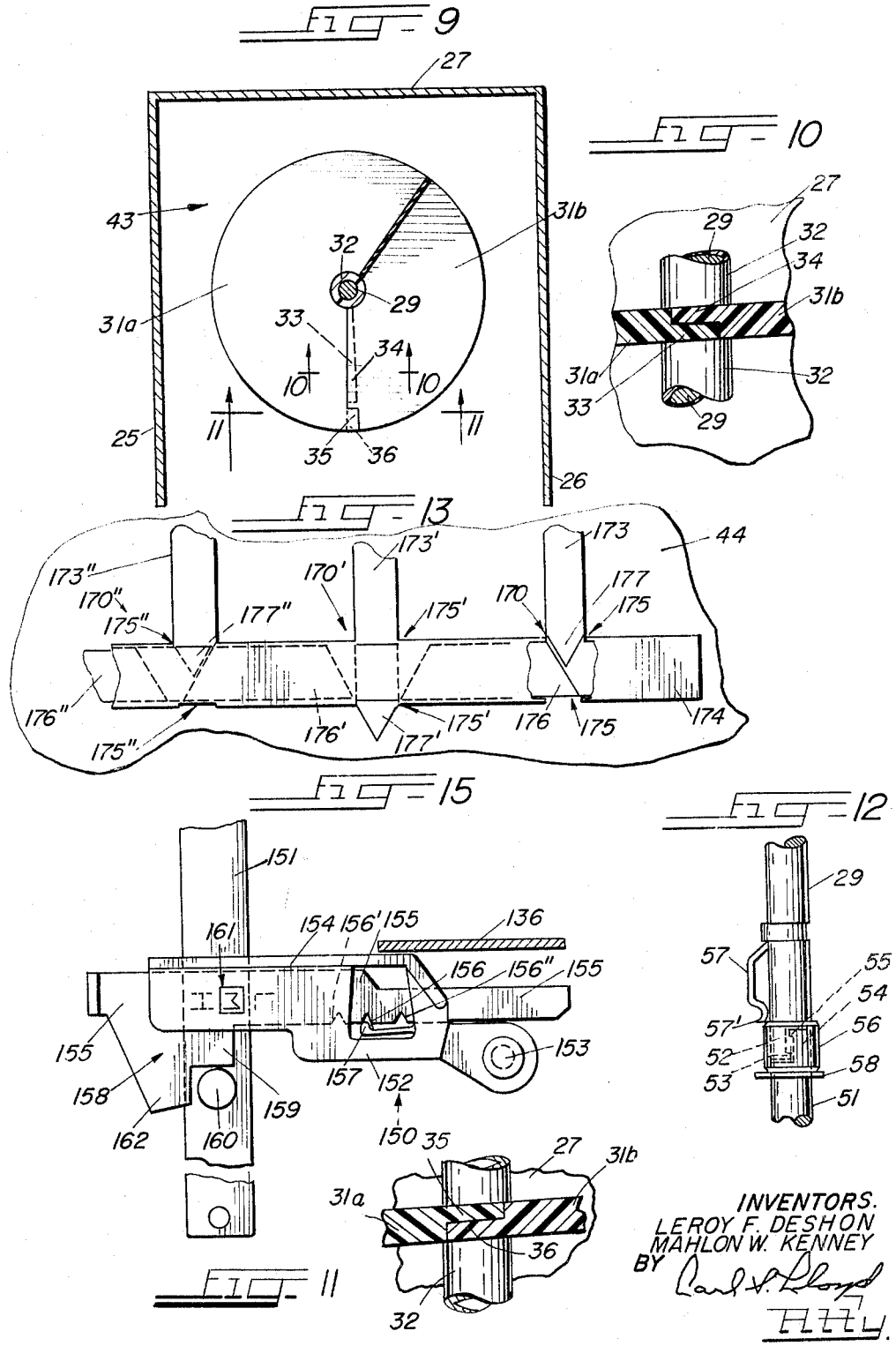

Sept. 20, 1966  LE ROY F. DE SHON ETAL  3,273,748
HELIX ARTICLE VENDOR
Filed Oct. 28, 1964  6 Sheets-Sheet 5
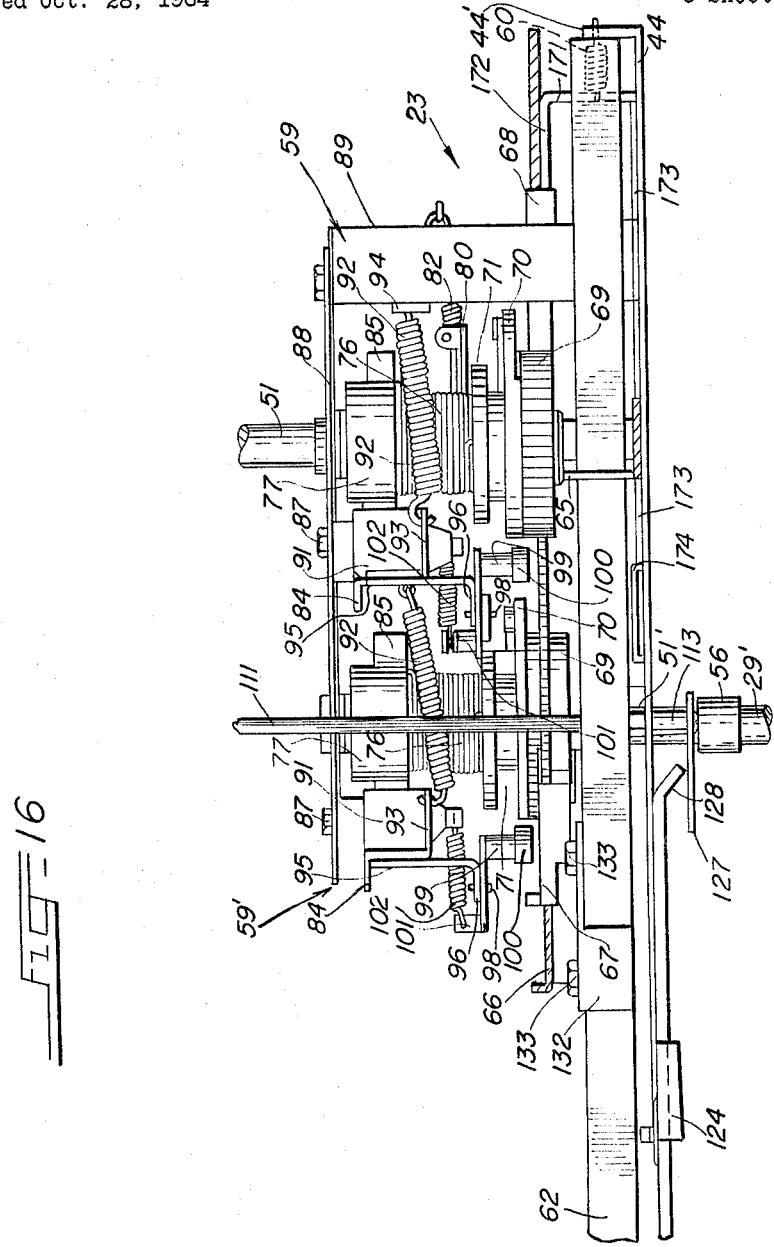
INVENTORS.
LEROY F. DESHON
MAHLON W. KENNEY
BY
ATTY.

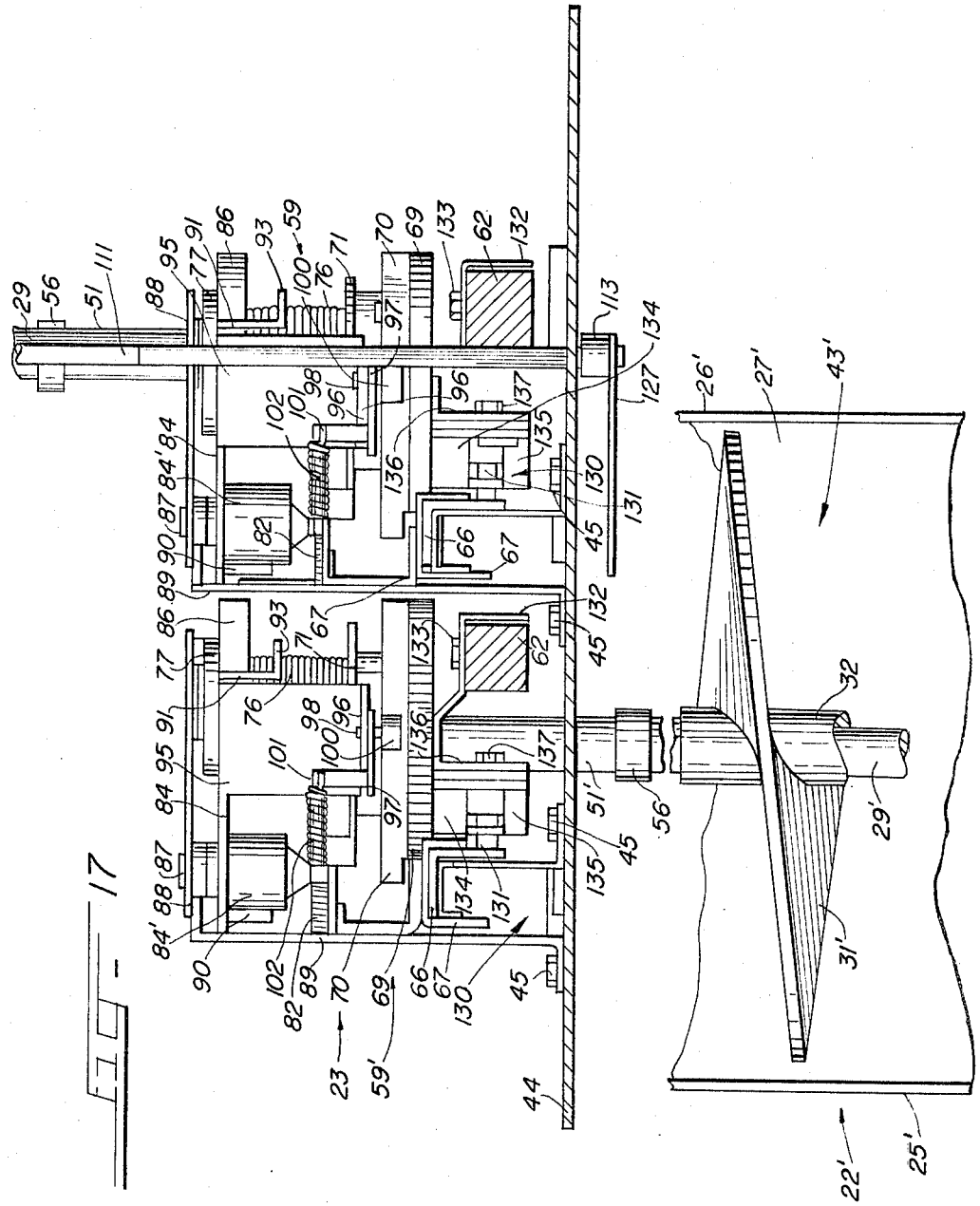

United States Patent Office 3,273,748
Patented Sept. 20, 1966

3,273,748
HELIX ARTICLE VENDOR
Le Roy F. De Shon, Park Forest, and Mahlon Wesley Kenney, Oak Park, Ill., assignors to The Seeburg Corporation, Chicago, Ill., a corporation of Delaware
Filed Oct. 28, 1964, Ser. No. 407,140
4 Claims. (Cl. 221—75)

This invention relates to vending machines and more particularly to vending machines in which vendible articles are stored in helical columns and are dispensed therefrom by controlled rotation of the columns.

Broadly described, the present invention comprises a plurality of helical columns, each of which is adapted to store vendible articles on its continuous spiral surface. A spring-powered releasing mechanism is provided in association with each helical column, each such mechanism being adapted to rotate its respective helical column through a predetermined arcuate movement (e.g., 180° in a preferred embodiment) upon actuation, thereby moving vendible articles along the helical storage column and dispensing one vendible article therefrom. Preferably, the releasing mechanisms are located mid-way between the top and the bottom of a vending machine, with half the helical columns extending upwardly therefrom, and half extending downwardly therefrom. The spring-powered releasing mechanism associated with each helical column is adapted to turn its respective column so that the vendible articles are moved downwardly along the column and are dispensed from the bottom thereof. Each releasing mechanism comprises means for charging a torsion spring, preferably in the form of a plunger-actuated rack and pinion arrangement which winds the torsion spring. The torsion spring is coupled to a shaft on which the helical column is rotatably mounted, and discharge of the torsion spring rotates the column by the required arcuate movement (e.g., 180°).

While vending machines utilizing helical columns to store vendible articles are known in the art, such mechanisms have been unsatisfactory. Usually, a prime mover electric motor is coupled to the helical columns for powering the system, and delivery of articles from a helical column powered by a conventional motor-driven assembly is unreliable. It has been found that, in order for a helical storage column to function properly in merchandise delivery, rapid "snap" rotation of the column should be effected so that, due to inertial effects, a stored article does not travel with the surface of the helical column, but rather moves downwardly along a generally vertical path. Conventional arrangements have failed to provide this desirable operational characteristic.

Accordingly, it is the primary object of the present invention to provide a vending machine which is adapted to store vendible articles in helical columns, each of which is adapted to positively and reliably dispense such articles upon actuation of a spring-powered releasing mechanism associated therewith.

It is another object of the present invention to provide a vending machine of the character described in which vendible articles are delivered from helical columns upon successive rotation thereof through predetermined arcs of movement (e.g., 180°).

Yet another object is to provide a vending machine of the character described in which the force necessary to rotate the helical columns through predetermined arcs is supplied by a series of quick-acting springs, one for each column.

Still another object is to provide a vending machine of the character described in which helical columns are disposed upwardly and downwardly from a center actuating assembly, whereby vendible articles are delivered from the lower end of each column.

A further object is to provide a vending machine of the character described in which the helical columns are disposed in positions such that the columns are easy to load and such that vendible articles may be retained in the columns without danger of accidental discharge therefrom.

A still further object is to provide a vending machine of the character described in which only one helical column at a time may be rotated through the predetermined arc of movement that is required to dispense vendible articles therefrom.

Another object is to provide a vending machine of the character described in which a releasing mechanism associated with a helical column having no vendible articles disposed therein is locked, whereby the helical column is impeded from rotation.

Yet another object of the present invention is to provide a vending machine of the character described which may be utilized to dispense vendible articles which vary in price.

These and other objects, advantages, and features of the present invention will hereinafter appear, and for purposes of illustration, but not of limitation, an exemplary embodiment of the present invention is shown in the accompanying drawings, in which:

FIGURE 1 is a fragmentary side elevation of one embodiment of the present invention with parts removed for purposes of clarity;

FIGURE 2 is a sectional view taken along line 2—2 in FIGURE 1;

FIGURE 3 is a fragmentary top plan view of the embodiment shown in FIGURE 1 with certain parts removed from purposes of clarity;

FIGURE 4 is a sectional view taken along line 4—4 in FIGURE 1;

FIGURE 5 is a sectional view taken along line 5—5 in FIGURE 1;

FIGURE 6 is a sectional view taken along line 6—6 in FIGURE 1;

FIGURE 7 is a sectional view taken along line 7—7 in FIGURE 3;

FIGURE 8 is a perspective view of the locking mechanism associated with one of the upper helical columns;

FIGURE 9 is a sectional view taken along line 9—9 in FIGURE 2;

FIGURE 10 is an enlarged sectional view taken along line 10—10 in FIGURE 9;

FIGURE 11 is an enlarged sectional view taken along line 11—11 in FIGURE 9;

FIGURE 12 is an enlarged side elevation of the joint between the helical column shaft and the actuating shaft of the releasing mechanism;

FIGURE 13 is a sectional view taken along line 13—13 in FIGURE 1;

FIGURE 14 is a view similar to that shown in FIGURE 6, after the helical column has been rotated through a portion of a 180° turn;

FIGURE 15 is an enlarged top plan view of the price-sensing mechanism;

FIGURE 16 is an enlarged fragmentary right side elevational view of the central portion of FIGURE 1; and FIGURE 17 is an enlarged fragmentary sectional view of the central portion of FIGURE 2.

With reference to the drawings, FIGURES 1 and 2 show portions of a storage magazine section 21 of a vending machine. Magazine section 21, which comprises an upper storage assembly 22, a lower storage assembly 22', and a central dispensing mechanism 23, is adapted to be fixedly mounted in a vending machine cabinet (not shown). Upper storage assembly 22 comprises a pair of generally parallelly aligned side walls 25, 26 (side wall 26 being removed from the FIGURE 1 illustration so as to reveal the disposition of the internal parts of the disclosed embodiment of the invention) and a rear wall 27 which is generally perpendicularly disposed to side walls 25, 26. An inclined ramp 24 sloping downwardly toward the rear of storage assembly 22 is fixedly mounted along the lower edges of side walls 25, 26 and rear wall 27. A cover plate 28 is attached to side walls 25, 26 and to rear wall 27 by any convenient means and defines therewith a box-like storage chamber.

A helix mounting shaft 29 is rotatably journaled in the cover plate 28 by any convenient means, such as a mounting bearing 30. A plurality of helix sections 31 is mounted on shaft 29 (in a manner hereinafter described), each section 31 comprising an approximately 360° helical arc. When adjacent sections 31 are interconnected, a helix 43 is formed, and helix 43 thus comprises a continuous spiral storage surface. It is preferred that the angle between the surface of each helix section 31 and the horizontal be about 8½°, but this angle (hereinafter referred to as the helix angle) may be increased or decreased so as to vary the distance between the surfaces of adjacent helix sections 31 and thereby provide a helix 43 adapted to hold larger or smaller vendible articles depending upon the helix angle selected. Utilization of the preferred helix angle of 8½° provides a helix 43 having an intersurface distance of approximately 1½ inches, such a helix being suitable for the storage of cigarette packages, candy bars, and the like.

Each helix section 31 is preferably formed in one piece of a durable plastic material such as high-impact polystyrene or nylon. A tubular central mounting hub 32 is provided in each helix section 31 and is adapted to be snugly fitted over helix mounting shaft 29 so that helix sections 31 are rotatable therewith. This may be accomplished by force-fitting helix sections 31 over shaft 29. However, other conventional arrangements could be utilized, e.g., each helix section 31 could be drilled and pinned to the mounting shafts 29 (by means not shown).

FIGURES 9, 10, and 11 show in greater detail the intersection of adjacent helix sections (identified by the reference characters 31a and 31b in FIGURES 9, 10, and 11). The edge of helix section 31a is formed into a pair of flanges 33 (see FIGURES 9 and 10) and 35 (see FIGURES 9 and 11). The edge of helix section 31b is also formed into a pair of flanges 34 (see FIGURES 9 and 10) and 36 (see FIGURES 9 and 11). Flanges 33, 35 are adapted to cooperate respectively with flanges 34, 36 in interlocking the adjacent helix sections 31a, 31b. Thus, flange 34 is adapted to tightly overlap flange 33 (see FIGURE 10) and flange 35 is adapted to tightly overlap flange 36 (see FIGURE 11). All adjacent helix sections 31 are interconnected in a similar manner whereby helix 43 is provided with a smooth, continuous surface suitable for storing vendible articles.

Lower storage assembly 22', comprising a pair of side walls 25', 26', a rear wall 27', and a lower inclined ramp 24', is disposed below dispensing mechanism 23. A helix mounting shaft 29' is rotatably journaled in lower inclined ramp 24' by suitable means, such as a mounting bearing 30', and a plurality of helix sections 31' (similar to helix sections 31) are mounted on shaft 29', thereby providing a lower helix 43' corresponding to the upper helix 43.

A pair of vertical actuating shafts 51, 51' (for helixes 43, 43' respectively) are provided, each being journaled in a base plate 44 for rotation about its longitudinal axis. Actuating shaft 51 is connected to helix mounting shaft 29 of upper helix 43, as best seen in FIGURE 12, and shaft 51' is connected with shaft 29' in a similar manner, as generally shown in FIGURES 1 and 2. A portion of the lower end of helix mounting shaft 29 is cut away, thereby forming a semi-circular projecting flange 52, which has a lip 53 formed along the lower edge thereof.

Similarly, the upper portion of actuating shaft 51 is cut away to form a semi-circular projecting flange 54, which has a lip 55 formed along its upper edge. A tubular mounting collar 56, adapted to slide along helix mounting shaft 29, is provided in conjunction with a spring retaining clip 57, which is adapted to hold mounting collar 56 against mounting shaft 29. When flanges 52, 54 (respectively on mounting shaft 29 and on actuating shaft 51) are placed in overlying cooperation with each other, mounting collar 56 may be slid downwardly (away from retaining clip 57) and over the joint thereby formed between mounting shaft 29 and actuating shaft 51. Mounting collar 56 is prevented from sliding further downwardly along actuating shaft 51 by a retaining ring 58 which is mounted on actuating shaft 51, and likewise mounting collar 56 is normally locked adjacent retaining ring 58 by the lowermost extremity 57' of clip 57. Mounting shaft 29 is thereby rotatable with actuating shaft 51, yet mounting shaft 29 may not be pulled away from actuating shaft 51 because of the presence of mounting collar 56, and the engagement of respective lips 53, 55. The joint thus formed between shafts 29 and 51 is flexible so that any slight difference in alignment between shafts 29 and 51 does not impair operation of the vending mechanism. A slight difference in shaft alignment is possible since storage assemblies 22, 22' are not mounted on base plate 44, but rather are independently mounted in a vending machine cabinet (not shown), as is base plate 44.

Dispensing mechanism 23 comprises a pair of similar helix releasing assemblies 59, 59' which are respectively associated with helixes 43, 43'. As shown in FIGURES 1–3, 16, and 17, each of the assemblies 59, 59' comprises a plunger knob 61 which is mounted at the end of a plunger shaft 62. Plunger shaft 62 is slidably mounted with respect to base plate 44 by means of a forward flange 63 and a pair of guide brackets 64, 65 on base plate 44, flange 63 and brackets 64, 65 each having openings therein through which plunger shaft 62 passes. A slidable rack 66, with gear teeth formed in one edge thereof, is provided and a pair of guide brackets 67, 68 are mounted on base plate 44 (see FIGURES 1, 2, and 3), brackets 67, 68 serving to guide and limit the movement of rack 66. Rack 66 is linked to plunger shaft 62 by means of a safety-release subassembly 130 (hereinafter described) so that when plunger shaft 62 is pulled outwardly from dispensing mechanism 24, rack 66 is pulled along with it, sliding in guide brackets 67, 68. Conventional means such as a spring 60 (shown in broken lines in FIGURE 16), which is stretched between a locking bar 171 mounted on rack 66 as hereinafter described, and a rear flange 44' on base plate 44, is provided for returning rack 66 to its normal rearwardly disposed position.

A pinion 69 is journaled for rotation about actuating shaft 51, and the teeth of pinion 69 are intermeshed with corresponding teeth on rack 66, whereby outward sliding movement of rack 66 causes rotation of pinion 69 in a counterclockwise direction (as seen in FIGURE 4). The engagement of pinion 69 with rack 66 is best seen in FIGURE 4. A cam surface 70 is provided along the upper edge of pinion 69 (for a purpose hereinafter described).

A spring-winding cam 71 is mounted above pinion 69 for rotation about actuating shaft 51 (see especially FIGURES 5, 16, and 17). The lower portion of winding cam 71 is formed into a pair of opposed cam surfaces 72, 73 (see FIGURE 4). A pawl 74 is pivotally mounted on the upper surface of pinion 69 by means of a pivot pin 75. Pawl 74 is biased by conventional means such as a spring (not shown) to pivot in a counterclockwise direction (as seen in FIGURE 4) so as to engage spring-winding cam 71, whereby counterclockwise rotation of pinion 69 results in similar counterclockwise rotation of winding cam 71, pawl 74 acting against the back of one of the cam surfaces 72, 73. Thus, outward movement of plunger shaft 62 and corresponding outward movement of rack 66 results in counterclockwise rotation of winding cam 71.

A torsion spring 76 is wound about mounting shaft 51 above winding cam 71. A lower end 76' of spring 76 is anchored in the upper portion of winding cam 71, and the upper end of torsion spring 76 is anchored in an index cam 77 which is fixedly mounted above spring 76 on actuating shaft 51 so as to be rotatable therewith. Thus, rotation of winding cam 71 with respect to actuating shaft 51 results in torsion spring 76 being charged by winding, since index cam 77 is fixedly mounted on actuating shaft 51. The upper portion of winding cam 71 is provided with a pair of opposed cam surfaces 78, 79 (see FIGURE 5). A pawl 80 is pivotally mounted on previously described rack guide bracket 68 by a pivot pin 81. Pawl 80 is biased to pivot in a counterclockwise direction (as seen in FIGURE 5), by means of a spring 82 which is stretched between pawl 80 and a projecting arm 83 on guide bracket 68, so as to engage the back of one of the cam surfaces 78, 79. The ratchet effect obtained by the engagement of pawl 80 with cam surfaces 78, 79 prevents unwinding of torsion spring 76 after it has been wound by counterclockwise rotation of winding cam 71.

Rotation of index cam 77 and actuating shaft 51 (which is interconnected to helix mounting shaft 29) is normally prevented by an escapement latch 84 (see FIGURE 6). Latch 84 is pivoted about a pivot bearing 87 on a cover plate 88 by means of a hub 84' (see FIGURE 17). Cover plate 88 is fixed to a mounting channel 89 which is in turn fixed to base plate 44. For purposes of illustrational clarity, escapement latch 84 and cover plate 88, along with upper storage assembly 22, have been removed from the right hand releasing mechanism shown in FIGURE 3. Escapement latch 84 is provided with a pair of lugs 90, 91 which extend downwardly from the flat upper portion thereof. As best seen in FIGURE 6, lug 91 is adapted to engage one of a pair of opposite similar cam surfaces 85, 86 on index cam 77 when latch 84 is disposed in the position shown in FIGURE 6. A spring 92, stretched between a bracket 93 and another bracket 94 on mounting channel 89, biases escapement latch 84 toward the position shown in FIGURE 6. Thus, index cam 77 and actuating shaft 51 to which it is fixed are prevented from rotating in a counterclockwise direction, as for example by the engagement of the back of cam surface 85, with lug 91. Thus, index cam 77 is prevented from rotating in the direction in which it is urged to rotate by the wound torsion spring 76.

If escapement latch 84 is pivoted in a clockwise direction about pivot bearing 87 (contrary to the bias of spring 92), lug 91 is disengaged from the back of cam surface 85, and index cam and actuating shaft 51 are free to rotate in a counterclockwise direction (as seen in FIGURE 6). However, when escapement latch 84 pivots in a clockwise direction about pivot bearing 87, lug 90 moves into a position wherein it can be engaged by the back of cam surface 86. Thus, index cam 77 is allowed to rotate through only a portion of a revolution, that is, from the position wherein cam surface 85 engages lug 91 to the position wherein the back of cam surface 86 engages lug 90. The relative disposition of latch 84 and cam 77 after the partial turn can clearly be seen in FIGURE 14. If escapement latch 84, disposed in the position wherein lug 90 engages the back of cam surface 86 (see FIGURE 14), is pivoted in a counterclockwise direction about pivot bearing 87, lug 90 is then disengaged from the backside of the engaged cam surface 86, and index cam 77 is free to complete the remainder of a 180° revolution until the backside of cam 86 engages the repositioned lug 91. Thus, successive clockwise, then counterclockwise pivoting of escapement latch 84 permits index cam 77 to undergo a 180° revolution under the urging of torsion spring 76. This results in actuating shaft 51 also being turned through 180°, and correspondingly helix mounting shaft 29 undergoes a similar 180° turn. Thus, helix 43 itself undergoes a 180° shift in angular position, resulting in the dispensation from the bottom thereof of one of the vendible articles stored therein, as hereinafter described.

The indicated pivotal movement of escapement latch 84 is controlled as follows. A projecting arm 95 extends downwardly from escapement latch 84 and terminates in a bracket 96 (see especially FIGURES 4, 16 and 17). A link 97 is pivoted to bracket 96 by means of a pivot pin 98. A projecting shaft 99 extends downwardly from one end of link 97, and a roller 100 is rotatably attached to projecting shaft 99, roller 100 being adapted to move along cam surface 70 on pinion 69. A post 101 projects upwardly from the other end of link 97, and a spring 102 is stretched between post 101 and the lower end of pivot bearing 87, whereby link 97 is biased to rotate in a clockwise direction as is seen in FIGURE 3. Clockwise rotation of link 97, however, is limited by bracket 96 against which post 101 abuts when link 97 is disposed in the position shown in FIGURES 3 and 4. With link 97 disposed in this position, counterclockwise rotation of pinion 69 (as viewed in FIGURE 4) results in a gradual camming outward of the roller 100 along cam surface 70. Since link 97 is prevented from pivoting further in a clockwise direction by post 101 (which abuts against bracket 96), the entire escapement latch 84 is pivoted in a clockwise direction (in opposition to the bias of the spring 92). Thus, as pinion 69 is rotated in a counterclockwise direction, escapement latch 84 is gradually pivoted in a clockwise direction. When pinion 69 reaches a given position (predetermined by the configuration of cam surface 70), escapement latch 84 will have pivoted so that lug 91 has moved out of engagement with the back of cam surface 85 (see FIGURE 6), and index cam 77 rotates through a partial revolution until the back of cam surface 86 engages lug 90 which moved into position as latch 84 pivoted (see FIGURE 14). Continued counterclockwise rotation of pinion 69 results in a further winding of torsion spring 76 as hereinbefore described. When, however, pinion 69 reaches the rotational position wherein roller 100 is adjacent the lobe portion 70' (see FIG. 4) on cam surface 70, continued clockwise rotation of pinion 69 results in roller 100 passing over lobe portion 70' and escapement latch 84 being pulled in a counterclockwise direction about pivot bearing 87, thereby causing disengagement of lug 90 from cam surface 86. This action permits index cam 77 to continue through the remainder of its 180° revolution until cam surface 86 engages lug 91 on escapement latch 84, lug 91 having moved back into the position wherein it is engaged therewith, as roller 100 passes over lobe portion 70' on cam surface 70. Thus, the arrangement of escapement latch 84, link 97, and roller 100 in conjunction with cam surface 70 controls the release of index cam 77.

After the two-step release of index cam 77, as above-described, pinion 69 is rotated in a clockwise direction (as seen in FIGURE 4) as rack 66 is pulled inwardly by return spring 60. When roller 100 comes to lobe portion 70' on cam surface 70 and is passed over the said portion, link 97 is pivoted in a reverse direction (that is, in a counterclockwise direction) in opposition to spring 102 so that lug 91 will remain in engagement with the back of cam surface 86 throughout the rotation of pinion 69 in a clockwise direction. As pinion 69 is rotated in the clockwise direction, roller 100 passes along cam surface 70, and link 97 is gradually pivoted in a clockwise direction about pivot pin 98 to its original disposition wherein post 101 abuts against bracket 96.

The operation of helix releasing assembly 59, whereby actuating shaft 51 is rotated through successive 180° turns so as to dispense vendible articles from the helix 43, can be described as follows. With the releasing assembly 59 in the position shown in FIGURES 1 and 3, the operation is begun by pulling outwardly on plunger knob 61, thereby causing plunger shaft 62 to slide outwardly from the rest of the mechanism 24. As will hereinafter be described, outward sliding of plunger shaft 62 causes rack 66 to slide outwardly in guide brackets 67, 68. As rack 66 is pulled outwardly, counterclockwise rotational movement is imparted to pinion 69. In turn, spring-winding cam 71 is rotated by means of pawl 74 which is pivoted to pinion 69, pawl 74 acting against the back of one of the cam surfaces 72, 73. Rotation of cam 71 in a counterclockwise direction about shaft 51 results in the winding of torsion spring 76, the lower end 76' of which is anchored in winding cam 71. The upper end of spring 76 is anchored in index cam 77, which is fixedly attached to actuating shaft 51, and which is prevented from rotating in a clockwise direction by lug 91 thereon which engages the back of cam surface 85 on index cam 77. As cam 71 is rotated in a counterclockwise direction, pawl 80 engages the back of one of the cam surfaces 78, 79 (as hereinbefore described), thereby preventing accidental unwinding of torsion spring 76.

Outward movement of plunger knob 61, resulting (as hereinbefore described) in the counterclockwise rotation of pinion 69, also causes the actuation of escapement latch 84. Latch 84 is pivoted in a clockwise direction about bearing 87 as roller 100 and link 97 are cammed upwardly against cam surface 70 on pinion 69. When escapement latch 84 has been sufficiently pivoted in a clockwise direction, lug 91 is disengaged from the back of cam surface 85, and index cam 77 is free to rotate in a counterclockwise direction under the urging of torsion spring 76 to a position wherein the back of cam surface 86 engages lug 90 on escapement latch 84 (see FIGURE 14). Continued counterclockwise rotation of pinion 69, however, results in roller 100 passing over lobe portion 70' on cam surface 70, thereby permitting escapement latch 84 to pivot in a counterclockwise direction to its former position, thereby causing lug 90 to disengage the back of cam surface 86 and thus permitting index cam 77 to continue its counterclockwise rotation until the back of cam surface 86 engages latch 91, so as to complete a 180° half-revolution. Since index cam 77 is fixedly mounted on actuating shaft 51, actuating shaft 51 is also turned through a 180° half-revolution as is helix mounting shaft 29 which is linked to actuating shaft 51 as hereinbefore explained. Thus, helix 43 itself undergoes 180° of rotation, resulting in dispensation therefrom of one of the vendible articles disposed along the continuous helix surface, as hereinafter described.

After escapement latch 84 completes its release of index cam 77 and after index cam 77 undergoes its full 180° turn, dispensing mechanism 23 is returned to its original position by means of rack return spring 60 which urges rack 66 toward its original position. As spring 60 pulls rack 66 to its original position, pinion 69 is rotated in a clockwise direction (as seen in FIGURE 4) and thus returns to its original position. Escapement latch 84, however, does not pivot during the return of pinion 69 to its original position, since link 97 merely pivots in a counterclockwise direction about pivot pin 98 while roller 100 cams about cam surface 70 as pinion 69 rotates in a clockwise direction. Thus, index cam 77 and actuating shaft 51 do not rotate during the resetting of rack 66 and pinion 69, the back of cam surface 86 being engaged by lug 91 on escapement latch 84 throughout the resetting portion of the operational cycle.

The operation of helix releasing assembly 59' is similar to that of assembly 59. Although helix 43' is disposed below the central dispensing mechanism 23, its vending operation is in all respects the same as that of helix 43. Thus, helix 43' is rotated in the same direction as helix 43 (counterclockwise as viewed from the top), and articles are dispensed from both helixes 43, 43' in an identical manner.

The subject invention thus provides a unique arrangement for storing and vending articles such as candy bars, cigarette packages and the like. For example, a plurality of articles A (schematically represented in broken lines in FIGURE 2) may be placed on the spiral surface of helix 43. The articles A are disposed on each side of the shaft 29 so as to form a pair of generally vertical columns. As helix 43 is rotated by its releasing assembly 59, the articles A move downwardly and are dispensed from the bottom of the helix 43. The articles A do not rotate with the helix 43, but rather retain the generally columnar configuration shown in FIGURE 2. When helix 43 is rotated in a counterclockwise direction (as viewed from the top) the spiral surface thereof is displaced 180° with reference to a given article A. Each article A is moved down the spiral surface of helix 43, although it remains disposed along the same general vertical line. In order that the articles A move along the helix in this manner, it is essential that helix 43 be sharply snapped through its 180° half-revolution so that, due to the effect of inertia, the articles A are not carried rotationally with the surface of helix 43, but rather the helix surface is rapidly moved out from under each article A. Thus, a primary advantage of the present invention is the unique releasing assembly 59 which by means of torsion spring 76 supplies the required powerful rotational force to the helix 43.

Articles A are dispensed from helix 43 by the same rapid 180° half-revolution which moves them downwardly along the helix 43. A rapid 180° half-revolution of helix 43 moves the surface of the bottommost helix section 31 out from under the bottommost article A, and article A is free to drop away from the helix 43. Successive 180° half-revolutions drop articles A alternately from the left and right sides of helix 43 (see FIGURE 2). An article dropping from helix 43 strikes the inclined ramp 24 (see FIGURE 1) and slides toward the rear of the storage magazine section 21. Articles are then conveyed by means (not shown) to a delivery area (not shown) where the customer can manually pick up the dispensed article.

The operation of lower helix 43' is comparable. Articles move downwardly along the helix 43' and are dispensed from the bottom thereof upon successive 180° half-revolutions. Articles dropping from helix 43' strike ramp 24', slide to the rear of the section 21, and are conveyed by means (not shown) to a delivery area (not shown).

It is preferred that the magazine storage section 21, comprising storage assemblies 22, 22' and dispensing mechanism 23, be mounted in a vending machine cabinet (not shown) at a slight angle, whereby the top of helix 43 is inclined toward the rear of the cabinet. With the section mounted at such an angle, articles slide to the rear of assemblies 22, 22', and thus there is no danger of articles sliding or slipping from the front of helixes 43, 43'. This arrangement allows the front sides of storage assemblies 22, 22' to be left open, thereby providing for easy loading of helixes 43, 43'. It is preferred that the angle at which section 21 is mounted be approximately six degrees with respect to the vertical.

Preferably, means are provided for locking a given helix 43 when the last vendible article has been dispensed therefrom. One arrangement for accomplishing this is shown in FIGURES 1, 2, and 8. For purposes of illustrational clarity, no helix locking means is shown for the lower helix 43'. A vertical locking shaft 111 is journaled for rotation between cover plate 28 and base plate 44 by means of mounting bearings 112, 113. A slidable member 114, with a longer upper leg 114' and a recess 115 adapted to receive the edge of helix 43 therein, is provided adjacent helix 43 (see FIGURES 1 and 2). Shaft 111 passes through an opening 116 in slidable member 114, member 114 thereby being vertically slidable on shaft 111. Although slidable member 114 is adapted to slide vertically along locking shaft 111, rotation of slidable member 114 about an axis passing longitudinally through locking shaft 111 results in rotation of locking shaft 111 about such axis. This is preferably accomplished by utilizing a locking shaft 111 which has a rectangular or square cross-sectional configuration (see FIGURE 8), and providing opening 116 with a corresponding cross-sectional configuration.

When the slidable member 114 is disposed in the position shown in FIGURE 1, wherein the upper leg 114' of member 114 rests on the upper helix section 31, repeated actuation of dispensing mechanism 23 results in slidable member 114 being carried vertically downwardly along locking shaft 111 by the outer edge of rotating helix 43. The descending movement of slidable member 114 on the locking shaft 111 corresponds to the movement of a topmost vendible article A (see FIGURE 2) originally disposed at the top of helix 43. Eventually, as the topmost vendible article A is carried to the bottom of helix 43 by repeated 180° turns thereof, slidable member 114 also reaches the bottom of helix 43, leg 114' resting on the bottommost helix section 31 as shown in broken lines in FIGURE 1. In this position, if helix 43 is turned 180° further, the edge of the bottommost helix section 31 passes completely out of recess 115 in slidable member 114. A projecting actuating pin 117 (see FIGURE 1) is provided on mounting shaft 29 beneath helix 43, a similar pin 117' being provided on shaft 29' beneath helix 43'. As slidable member 114 drops below the bottommost helix section 31, the said member 114 is engaged by actuating projecting pin 117 which is moving in a counterclockwise direction with mounting shaft 29. Thus, slidable member 114 is caused to rotate in a clockwise direction and correspondingly locking shaft 111 rotates in a clockwise direction.

A notch 118 (see FIGURE 3) is cut in plunger shaft 62 at a point adjacent bracket 64 when plunger shaft 62 is disposed in the position shown in FIGURE 3. A locking lever 119 is pivoted to bracket 64 about a pivot pin 120 (see FIGURE 3), and a locking lug 121 is provided on locking lever 119. Lug 121 is adapted to fit into notch 118 and thereby prevent movement of plunger shaft 62 whenever locking lever 119 is rotated in a clockwise direction as seen in FIGURE 8. For clarity, plunger shaft 62 and notch 118 are shown in broken lines in FIGURE 8. Locking lever 119 is biased to rotate in the indicated counterclockwise direction by the cooperative effect of gravity and a spring 119' which is stretched between lug 121 on lever 119 and base plate 44 (see FIGURE 3). A crank rod 122 is pivotally mounted beneath base plate 44 by means of a pair of journaling brackets 123, 124. The forward end of crank rod 122 is formed into an offset portion which is pivoted to the lower portion 126 of locking lever 119. Reciprocal rotation of crank rod 122 thus moves lug 121 in and out of notch 118 in plunger shaft 62. The lower end of locking shaft 111 is fixed to a locking plate 127 (see FIGURE 8), and the rearward end of crank rod 122 is formed into a generally perpendicular projection 128. In the unlocked position shown in FIGURE 8, projection 128 on crank rod 122 is supported by locking plate 127. This support maintains locking lever 119 in the position shown in FIGURE 8 wherein plunger shaft 62 is free to slide inwardly and outwardly. However, if locking shaft 111 is rotated in a clockwise direction (as hereinbefore described), locking plate 127 moves out from under and no longer supports projection 128 on crank rod 122. Thus, due to the urging of spring 119' and the force of gravity, lever 119 rotates in a clockwise direction (as seen in FIGURE 8), and lug 121 drops into notch 118, thereby immobilizing plunger shaft 62.

Lever 119 has a cam surface 129 which is adapted to actuate a continuing lever system (not shown) mounted in the vending machine cabinet (not shown), whereby a visual signal is produced at the front of the cabinet so as to indicate that the supply of vendible articles in the helix 43 is exhausted.

When an empty helix has been refilled with vendible articles A (see FIGURE 2), the locking mechanism may be reset as follows. Slidable member 114 is manually raised to the top of shaft 111 and is rotated in a counterclockwise direction so as to receive the outer edge of the upper helix section 31 within the recess 115 therein. At the same time locking shaft 111 is rotated in a counterclockwise direction, thus causing locking plate 127 to rotate in a counterclockwise direction. The edge of locking plate 127 then cams against projection 128 which is pushed upwardly, thereby causing crank rod 122 to rotate in a counterclockwise direction in brackets 123, 124. This causes locking lever 119 to rotate in a counterclockwise direction about pivot pin 120, thereby withdrawing lug 121 from notch 118 and permitting plunger shaft 62 to be pulled outwardly from the dispensing mechanism 23.

As hereinbefore indicated, a safety-release subassembly 130 is provided by which sliding movement of each plunger shaft 62 is transferred to its corresponding rack 66. A horizontally projecting pin 131 is provided on rack 66 (see FIGURE 3), and a mounting channel 132 is fixed to plunger shaft 62 by conventional means, such as screws 133. A pair of opposed arms 134, 135 are pivotally mounted on a projecting plate 136 on mounting channel 132 by means of a pivot pin 137 (see FIGURE 7). Opposed arms 134, 135 are configured such that normally they touch each other at respective points 138, 139 whereby an opening 131' is formed through which projecting pin 131 on rack 66 passes. Thus, outward movement of plunger shaft 62 (that is, movement toward the right in FIGURE 7) results in points 138, 139 acting against projecting pin 131, thereby carrying rack 66 outwardly along with plunger shaft 62. A spring 140 is hooked between arms 134, 135 so as to bias them toward the adjacent position shown in FIGURE 7. If however, during the withdrawal of plunger shaft 62 rack 66 should, for any reason, become jammed and no longer slidable outwardly, the points 138, 139 acting against projecting pin 131 would cause arms 134, 135 to separate (in opposition to the bias of spring 140) and pin 131 would slip out of the clasp of arms 134, 135 and plunger shaft 62 would continue its outward movement, rack 66 being left behind in its jammed position. This escape arrangement is a safety feature of the subject invention in that it prevents the jam-up of the plunger shaft itself and permits free withdrawal of the shaft even if the helix releasing assembly 59 itself is jammed. Thus, the prospective purchaser cannot damage the helix releasing assembly 59 by futile manipulation of shaft 62 when the mechanism is jammed. Rather, the plunger shaft 62 is freed from the remainder of assembly 59, as required.

Another advantage of the subject invention is that it may be utilized to vend articles which sell at different prices, and to this end a price-sensing subassembly 150 is provided (see especially FIGURE 15). A credit-pricing bar 151 is slidably mounted for reciprocal longitudinal movement on base plate 44 by conventional mounting means (not shown). Bar 151 is biased toward the position shown in FIGURE 3 by conventional means, such as a spring (not shown) for purposes that will hereinafter be apparent. A pricing lever 152 (see FIGURES 7 and 15) is pivotally mounted on base plate 44 about a pivot pin 153. Lever 152 has an upwardly extending flange 154 formed on one side, and flange 154 is adapted to be engaged by plate 136 on channel 132 when shaft 62 is pulled outwardly. The action of plate 136 camming against flange 154 causes lever 152 to pivot in a counterclockwise direction from its normal rest position (see FIGURE 3) to the position shown in FIGURE 15.

A price-adjustment member 155 is manually slidable in a slot-like opening in lever 152. Member 155 has three notches 156, 156', and 156", formed along one edge, and a spring tab 157, preferably formed integrally with lever 152, is biased to engage one of the notches, so as to prevent member 155 from accidentally slidably moving with respect to lever 152. Member 155 has a stepped surface 158 formed adjacent credit-pricing bar 151. With adjustment member 155 disposed as shown in FIGURE 15 (tab 157 engaging notch 156 and the letter "M" showing in a window 161 formed in lever 152), an intermediate area 159 on stepped surface 158 engages a projecting pin 160. When lever 152 is pivoted in response to the outward movement of shaft 62, area 159 cams against pin 160, and bar 151 is slid a given distance. When, however, member 155 is pushed inwardly until tab 157 engages notch 156' (i.e., where the letter "H" shows in window 161), then an area 162 of the stepped surface 158 engages pin 160, and when lever 152 pivots through the same arc, upon withdrawal of shaft 62, bar 151 is moved a relatively greater distance than when adjustment member 155 is disposed in the intermediate position (as shown in FIGURE 15.). If member 155 is pulled outwardly until the letter "L" shows in window 161 (a position wherein tab 158 engages notch 156"), then when lever 152 pivots, no part of stepped surface 158 engages pin 160, and, hence, bar 151 is not moved.

The position of member 155 may thus be adjusted such that extent of movement of bar 151 is directly proportional to the price of the articles disposed in the helix 43. It will be apparent to one skilled in the art that credit-pricing bar 151 may be connected with a credit-responsive device of conventional nature (not shown) so as, for example, to have the amount of change received by a purchaser controlled by the movement of credit-pricing bar 151.

FIGURES 1, 3, and 13 illustrate a series of assemblies which prevent actuation of more than one dispensing mechanism 23 at a time. In FIGURE 13 three assemblies 170, 170', and 170" are shown, corresponding to three helix releasing assemblies 59, whereas in the previously described FIGURES 1, 3, and 16 only two helix releasing assemblies 59, 59' are shown. In FIGURE 13, the corresponding parts associated with the three assemblies are differentiated by appending single prime and double prime notations to the reference characters indicating the second and third assemblies. In each assembly, the previously described locking bar 171 (see FIGURES 1 and 16) is provided with an upper projecting arm 172 which is fixedly attached by conventional means to the underside of the corresponding rack 66. A longer lower arm 173 (see FIGURES 13 and 16) on bar 171 is adapted to slide on base plate 44 as rack 66 moves inwardly and outwardly, as hereinbefore described. A link guide channel 174 (see FIGURES 3, 13, and 16) is fixedly mounted on base plate 44 by a suitable means (not shown). A series of openings 175 is provided in the sides of link guide channel 174 so as to permit the lower arms 173 on locking bar 171 to slide perpendicularly therethrough (see especially FIGURE 13). A series of trapezoidal locking links 176 are disposed within the space defined by link guide channel 174 and base plate 44 and are adapted to move slidably therein (see FIGURE 13). Each lower arm 173 is provided with a generally pointed forward end 177 which is adapted to move against the slanting ends of trapezoidal links 176 thereby causing links 176 to slidably move within link guide channel 174. Thus, in FIGURE 13, arm 173' has moved outwardly (corresponding to outward movement of its corresponding plunger shaft 62, not shown), thereby causing trapezoidal link 176 to slide to the right to the position in which it is disposed in FIGURE 13. Arm 173' is then free to slide inwardly and outwardly through the corresponding openings 175 in link guide channel 174. However, when trapezoidal link 176 moves to the position shown in FIGURE 13, link 176 prevents outward movement of arm 173. Similarly, lower arm 173" is prevented from moving outwardly by trapezoidal link 176'. If, however, lower arm 173' were withdrawn to the position occupied by the other two lower arms 173, 173", then one of such other lower arms 173 could be slid outwardly with its corresponding rack 66, the pointed forward end 177 thereof camming against the slanted end of the corresponding link 176 and pushing link 176 to the left as seen in FIGURE 13 with lower arm 173 then being free to continue its outward movement. This arrangement of parts provides a preferred lock-out by which only one plunger shaft 62 may be withdrawn at a given time.

It will be obvious to one skilled in the art that movement of plunger shaft 62 may be keyed to a coin-receiving device of a conventional variety (not shown) whereby a predetermined value in coins must be inserted in order to free the plunger shaft 62 so that a vendible article may be dispensed from helix 43. Preferably, the coin-receiving device is associated with the price-sensing subassembly 150 hereinbefore described. It will further be obvious to one skilled in the art that while only two helixes 43, 43' are shown in the accompanying drawings, substantially any number of similar helixes may be provided in side-by-side disposition on both sides of a base plate 44 to provide a vending machine of generally symmetrical configuration.

The helix article vendor described herein is particularly well suited for the dispensation of candy bar items, which use is the preferred practice of the subject invention; however, various other articles (such as cigarette packages, gums, mints, etc.) could be accommodated in a vendor of the type described herein.

Obviously, many modifications and variations of the invention are possible. It is to be understood that the invention is not limited in its application to the details of construction and arrangement of parts specifically described or illustrated. It should further be understood that various changes, modifications and alterations may be effected in the parts and elements of the described embodiment without departing from the spirit and scope of the present invention, as described in the appended claims.

What is claimed is:
1. In a vending machine, a storage and releasing mechanism comprising:
   a frame member;
   a helical member rotatably journaled in the frame member for rotation about its longitudinal axis, the said helical member providing a continuous spiral surface upon which vendible articles may be disposed;
   an actuating member journaled for rotation in the frame member, the said actuating member being adapted to impart rotational movement to the helical member;
   index means on the actuating member, the said index means being adapted to rotate therewith;
   latching means pivotally mounted on the frame member between a first position and a second position, the said latching means being adapted to engage the index means and to control the rotation thereof, whereby movement of the latching means from its first to its second position frees the index means for rotation through a portion of an arc of substantially 180° and movement of the latching means thereafter from its second position to its first position frees the index means for rotation through the remainder of the arc of substantially 180°;
   spring means adapted to be wound whereby to exert rotational force on the index means;
   means adapted to wind the spring means; and
   latch-releasing means adapted after winding of the spring means to move the latching means to its second position and thereafter to its first position, whereby the latching means releases the index means in two steps for rotation thereof by the spring means through an arc of substantially 180°, so as to dispense a vendible article from the helical member.

2. In a vending machine, a storage and releasing mechanism comprising:
a frame member;
a helical member journaled in the frame member for rotation about its longitudinal axis, the said helical member providing a continuous spiral surface upon which vendible articles may be disposed;
an actuating member journaled for rotation in the frame member, the said actuating member being adapted to impart rotational movement to the helical member;
an index member on the actuating member adapted to rotate therewith;
a latching member pivotally mounted on the frame member between a first position and a second position, the said latching member being adapted to engage the index member and to control the rotation thereof, whereby movement of the latching member from its first to its second position frees the index member for rotation through a portion of an arc of substantially 180° and movement of the latching member thereafter from its second position to its first position frees the index member for rotation through the remainder of the arc of substantially 180°;
a spring member adapted to be wound whereby to exert rotational force on the index member;
a spring-winding member journaled for rotation in the frame member, the said spring-winding member being adapted to wind the spring member;
a geared pinion rotatably mounted on the frame member;
a geared rack slidably mounted on the frame member between a first position and a second position, the said rack being adapted to engage the pinion whereby movement of the rack between its first and its second positions imparts rotational movement to the pinion;
means for sliding the rack from its first to its second position;
ratchet means on the pinion adapted to cause the spring-winding member to rotate therewith whenever the rack is slid from its first to its second position, whereby to wind the spring member; and
latch-releasing means adapted after winding of the spring member to move the latching member to its second position and thereafter to its first position, whereby the latching member releases the index member in two steps for rotation thereof by the spring member through an arc of substantially 180°, so as to dispense a vendible article from the helical member.

3. A storage and releasing mechanism, as claimed in claim 2, and further comprising:
biasing means urging the rack toward its first position.

4. A storage and releasing mechanism, as claimed in claim 2, and further comprising:
safety means releasably interconnecting the rack and the means for sliding the rack, whereby whenever the rack is impeded from moving from its first to its second position, the means for sliding the rack is releasable therefrom.

References Cited by the Examiner
UNITED STATES PATENTS

| | | | |
|---|---|---|---|
| 417,354 | 12/1889 | Crepeau | 221—152 |
| 538,173 | 4/1895 | Lowenbach et al. | 221—130 |
| 690,068 | 12/1901 | Mills | 221—19 |
| 708,193 | 9/1902 | Ashton | 221—243 |
| 921,763 | 5/1909 | Weed | 221—75 |
| 983,045 | 1/1911 | Gossman et al. | 221—6 |
| 1,356,345 | 10/1920 | Dun Lany | 221—125 |
| 2,230,401 | 2/1941 | Gabrielsen | 221—125 |
| 2,529,374 | 11/1950 | Caruso | 221—125 |
| 2,564,552 | 8/1951 | Verdery | 221—75 |
| 2,784,871 | 3/1957 | Gabrielsen | 221—19 |
| 2,918,195 | 12/1959 | Frerk | 221—75 |

ROBERT B. REEVES, *Primary Examiner.*

WALTER SOBIN, *Examiner.*